UNITED STATES PATENT OFFICE.

ALEXANDER L. STRAUS, OF BALTIMORE, MARYLAND.

NON-ALCOHOLIC BEVERAGE.

1,265,274.  Specification of Letters Patent.  Patented May 7, 1918.

No Drawing.  Application filed August 4, 1917.  Serial No. 184,473.

*To all whom it may concern:*

Be it known that I, ALEXANDER L. STRAUS, a citizen of the United States, residing at Baltimore, in the State of Maryland, have invented certain new and useful Improvements in Non-Alcoholic Beverages; and I do hereby declare the following to be a full, clear, and exact description of the invention, such as will enable others skilled in the art to which it appertains to make and use the same.

This invention relates to an improved non-alcoholic beverage or composition of matter made from fermented malt liquors, and has for its object to provide a beverage of this character which will more closely resemble in taste the particular liquor from which it was derived than those heretofore proposed.

With this and other objects in view the invention consists in the novel beverages or compositions of matter hereinafter disclosed and particularly pointed out in the claims.

In producing this beverage I prefer to follow the procedure outlined in my Patent #1223121, dated April 17, 1917, and entitled Process for making a non-alcoholic beverage, and to use beer or ale of the ordinary alcoholic character.

In order that this beverage may be easily distinguished from others and in order that a preferred process of producing the same may be readily at hand, I will suppose one hundred barrels of fermented malt liquor such as ale or beer is to be treated in a single operation. This quantity is first boiled in a brewer's kettle, or substantially all the alcohol is otherwise removed as by evaporation at a pressure lower than that of the atmosphere.

The boiling of the beer not only removes the alcohol, but it also removes a considerable portion of the water, substantially all of the hops, as well as other well known constituents, so that the original beer has its character profoundly changed in the production of the resulting alcohol free liquor, which constitutes the base or raw material for making the desired non-alcoholic beverage.

In order to restore the original taste of the original beer or other fermented malt liquor from which the raw material is derived, I add to the boiled product or raw material a quantity of water preferably in a heated condition which will be equivalent to the quantity of water that has been evaporated, and I add to every ten barrels of said raw material when the boiling operation is nearing its close about one pound of common salt, and at about say one half hour before the boiling operation is completed, I add say one fifth of a pound of hops and say two ounces of gum arabic or other foam producing material per barrel of the boiling beverage, or raw material.

I next add a sweetening material such as say one and three quarter pounds of sugar, preferably granulated cane sugar, per barrel, and I also add to the entire beverage product now being boiled, and at about ten minutes before the boiling operation is completed, three pounds of concentrated hops. By concentrated hops I mean hops of a different character from the ordinary hops, that is, I mean pure hops in which the dirt, seed and impurities, foreign matter, etc., have been removed. The addition of the hops and foregoing materials will be found to prevent turbidity in the finished product and to add to its keeping qualities. The temperature of the beverage thus produced may now be rapidly reduced to say 4° C. by running it through any suitable cooler, and during this process of cooling, I add say one half ounce of liquid quassia or an equivalent bitter tasting material per barrel of the beverage. This liquid quassia is conveniently produced by taking one ounce of commercial quassia and boiling it in a sufficient quantity of water to produce say 16 ounces of liquor, and I then add one half to one ounce of this liquid thus obtained per barrel of the beverage while the beverage is being cooled as above stated.

After the beverage has passed the cooler it may be run into a chip-cask and while in the chip-cask I may add finings in the manner usual with the ordinary brewing of beer. I also prefer to add a suitable quantity of a chill proofing preparation, preferably a pepsin compound known to the trade as "caluperline."

While the beverage is in storage, I may add a suitable preservative such as say four commercial sized tablets of meta-bisulfite of potassium known to the trade as "K. M. S." or their equivalent per barrel. After the beverage has been in storage from say two to five days it may be filtered and carbonated at from say fifteen to sixteen pounds of carbonic acid gas pressure, and it is then ready for the market. It will be observed that in producing this beverage the following steps are observed:—

The beer is first brewed from malt hops and cereals.

Second: Substantially all the alcohol is eliminated and some of its water, thus profoundly changing the character of the beer and producing a raw base material from which the finished beverage is later had.

Third: I restore the same quantity of water that has been eliminated preferably in a heated condition.

Fourth: I add say one pound of salt to every ten barrels of the product.

Fifth: I add one fifth of a pound of hops and two ounces of gum arabic per barrel of the beverage.

Sixth: There is added say one and three fourths pounds of granulated sugar per barrel.

Seventh: I add to the entire beverage product approximately say ten minutes before the boiling operation is completed three pounds of concentrated hops.

Eighth: I rapidly reduce the temperature of the beverage to approximately 4° C.

Ninth: There is added say one half to one ounce of quassia liquor per barrel.

Tenth: There is added the usual quantity of filings.

Eleventh: There is added a suitable chill proofing preparation.

Twelfth: There is added say four commercial size meta-bisulfite of potassium tablets per barrel.

Thirteenth: The beverage is stored from say two to five days.

Fourteenth: The beverage is then filtered and carbonated to say fifteen to sixteen pounds pressure of carbonic acid gas.

Fifteenth: The finished beverage is now drawn off into packages ready for the market.

It will be observerd that therefore this finished beverage can be readily distinguished from other somewhat similar beverages in that it contains as a base material fermented malt liquors such as beer from which all, or substantially all the alcohol has been boiled. It further contains hops, salt, sugar, quassia, foam producing material, such as gum arabic, and a chill proofing material as well as dissolved meta-bisulfite of potassium or its equivalent in the proportions indicated above.

It therefore can be readily distinguished from other products not only by its taste which very closely indeed approximates the original beer, or other malt liquor from which it was derived, but by the presence of the above mentioned constituents. Not only does the above process produce a non-alcoholic beverage from ordinary beer or ale that has substantially the taste, and the appearance of the alcoholic liquor from which it was derived, but it is found to be nutritious as well.

It is obvious that those skilled in the art may vary the details of the product as well as the proportions of the parts without departing from the spirit of the invention, and therefore, I do not wish to be limited to the above disclosure except as may be required by the claims.

What I claim is:—

1. The herein described non-alcoholic beverage the same containing a base material consisting of a fermented malt liquor from which substantially all the alcohol has been eliminated, and containing salt, sugar and hops, substantially as described.

2. The herein described non-alcoholic beverage the same containing a base material consisting of a fermented malt liquor from which substantially all of the alcohol has been eliminated, and containing salt, sugar, hops and a bitter tasting material, substantially as described.

3. The herein described non-alcoholic beverage the same containing a base material consisting of a fermented malt liquor from which substantially all the alcohol has been eliminated, and containing salt, a sweetening material, hops, a bitter tasting material and a foam producing material, substantially as described.

4. The herein described non-alcoholic beverage the same containing a base material consisting of a fermented malt liquor from which substantially all the alcohol has been eliminated, and containing salt, sugar, hops, quassia, a foam producing material and a chill proofing material, substantially as described.

5. The herein described non-alcoholic beverage the same containing a base material consisting of a fermented malt liquor from which substantially all the alcohol has been eliminated, and containing salt, sugar, hops, quassia, and a preservative compound, substantially as described.

6. The herein described non-alcoholic beverage the same containing a base material consisting of a fermented malt liquor from which substantially all the alcohol has been eliminated, and containing salt, sugar, hops, quassia, a meta-sulfite of potassium, and substantially the same quantity of water that was present in the original malt liquor, substantially as described.

7. The herein described non-alcoholic beverage the same composed of a base material consisting of beer from which the alcohol has been eliminated and containing substantially the same quantity of water as the original beer, and also containing salt, hops, gum arabic, sugar, quassia, a chill proof preparation, potassium meta-bisulfite and carbonic acid gas, substantially as described.

In testimony whereof I affix my signature, in presence of two witnesses.

ALEXANDER L. STRAUS.

Witnesses:
C. FERD. SEELEY,
M. B. BOWEN.